(12) United States Patent
Guo

(10) Patent No.: US 12,517,470 B2
(45) Date of Patent: *Jan. 6, 2026

(54) ELECTRONIC DEVICE AND CONTROL METHOD

(71) Applicant: Nokia Technologies Oy, Espoo (FI)

(72) Inventor: Yuanming Guo, Dongguan (CN)

(73) Assignee: Nokia Technologies Oy, Espoo (FI)

( * ) Notice: Subject to any disclaimer, the term of this patent is extended or adjusted under 35 U.S.C. 154(b) by 388 days.

This patent is subject to a terminal disclaimer.

(21) Appl. No.: 17/896,043

(22) Filed: Aug. 25, 2022

(65) Prior Publication Data

US 2022/0413447 A1    Dec. 29, 2022

Related U.S. Application Data

(63) Continuation of application No. PCT/CN2021/077038, filed on Feb. 20, 2021.

(30) Foreign Application Priority Data

Feb. 27, 2020   (CN) .......................... 202010125240.X

(51) Int. Cl.
*G04G 17/04*    (2006.01)
*G04G 17/08*    (2006.01)
*G04G 21/00*    (2010.01)
*G06F 1/16*     (2006.01)

(52) U.S. Cl.
CPC ........... *G04G 17/045* (2013.01); *G04G 17/08* (2013.01); *G04G 21/00* (2013.01); *G06F 1/163* (2013.01)

(58) Field of Classification Search
None
See application file for complete search history.

(56) References Cited

U.S. PATENT DOCUMENTS

| 10,567,378 | B2 | 2/2020 | Fukuda |
| 2018/0307333 | A1 | 10/2018 | Lim et al. |
| 2019/0258395 | A1 | 8/2019 | Balaram |
| 2019/0271949 | A1* | 9/2019 | Kadmiri ................. G04B 37/22 |
| 2022/0197334 | A1 | 6/2022 | Zheng et al. |

FOREIGN PATENT DOCUMENTS

| CN | 102081347 A | 6/2011 |
| CN | 105810489 A | 7/2016 |
| CN | 105929893 A | 9/2016 |

(Continued)

OTHER PUBLICATIONS

Translation of EP 3032350, Espacenet (Year: 2016).*

(Continued)

*Primary Examiner* — Renee S Luebke
*Assistant Examiner* — Matthew Daniel Hwang
(74) *Attorney, Agent, or Firm* — Nokia Technologies Oy

(57) ABSTRACT

An electronic device and a control method are provided. The electronic device includes: a housing with an accommodating space, where the housing is provided with a groove surrounding the accommodating space, and a first dielectric and a second dielectric are disposed on a sidewall of the groove; and a bezel, where at least part of the bezel is disposed in the groove; and the bezel is capable of rotating around an axial direction of the housing in the groove.

5 Claims, 4 Drawing Sheets

(56) References Cited

FOREIGN PATENT DOCUMENTS

| CN | 107003788 | A  | 8/2017 |
|----|-----------|----|--------|
| CN | 110716417 | A  | 1/2020 |
| CN | 111352559 | A  | 6/2020 |
| EP | 3032360   | A1 | 6/2016 |
| JP | 2001075724 | A | 3/2001 |
| JP | 2016054073 | A | 4/2016 |
| JP | 2018521425 | A | 8/2018 |
| JP | 2019517663 | A | 6/2019 |

OTHER PUBLICATIONS

International Search Report issued in corresponding International Application No. PCT/CN2021/077038, mailed Apr. 28, 2021, 4 pages.
First Office Action issued in related Chinese Application No. 202010125240.X , mailed Jan. 15, 2021, 11 pages.
Extended European Search Report issued in related European Application No. 21760783.7, mailed Jul. 11, 2023, 7 pages.
Notice of reason of refusal issued in related Japanese Application No. 2022-549649 , mailed Oct. 3, 2023, 2 pages.

* cited by examiner

ELECTRONIC DEVICE AND CONTROL METHOD

CROSS-REFERENCE TO RELATED APPLICATIONS

This application is a continuation of International Application No. PCT/CN2021/077038, filed on Feb. 20, 2021, which claims priority to Chinese Patent Application No. 202010125240.X, filed on Feb. 27, 2020. The entire contents of each of the above-identified applications are expressly incorporated herein by reference.

TECHNICAL FIELD

The present disclosure relates to the field of communications technologies, and in particular, to an electronic device and a control method.

BACKGROUND

At present, smartwatches have been widely used. In actual application of the smartwatches, to better enhance human-computer interaction experience, the smartwatches generally have an integrated touch display.

However, in practice, it is found that when a user directly performs an operation on a touch display with a finger, part of a display area of the touch display is easily blocked by the finger due to a small size of the touch display. As a result, the user cannot intuitively view the blocked part of the display area. For example, in use of a smartwatch, a first operation to be performed is to unlock. When a user unlocks a touch display with a finger, part of a display area of the touch display is easily blocked by the finger due to a small size of the touch display, which often causes unlocking errors and requires the user to unlock again, featuring complex operation. For example, if no lock is set for the screen, user's privacy is easily exposed.

SUMMARY

Embodiments of the present disclosure provide an electronic device and a control method.

According to a first aspect, an embodiment of the present disclosure provides an electronic device, including:
- a housing with an accommodating space, where the housing is provided with a groove surrounding the accommodating space, and a first conductive layer and a second conductive layer are disposed on a sidewall of the groove; and
- a bezel, where at least part of the bezel is disposed in the groove; and
- the bezel is capable of rotating around an axial direction of the housing in the groove.

According to a second aspect, an embodiment of the present disclosure further provides a control method applied to the foregoing electronic device, including:
- monitoring an electrical signal between a first conductive layer and a second conductive layer in the electronic device; and
- adjusting a state of the electronic device based on the detected electrical signal.

According to a third aspect, an embodiment of the present disclosure further provides a computer-readable storage medium, where the computer-readable storage medium stores a computer program, and when the computer program is executed by a processor, the steps of the foregoing control method applied to the electronic device are implemented.

According to a fourth aspect, an embodiment of the present disclosure further provides an electronic device, including a processor, a memory, and a computer program stored in the memory and capable of running on the processor, where when the computer program is executed by the processor, the steps of the foregoing control method are implemented.

According to a fifth aspect, an embodiment of the present disclosure further provides a computer software product, where the computer software product is stored in a non-volatile storage medium, and the software product is configured to be executed by at least one processor to implement the steps of the foregoing control method.

According to a sixth aspect, an embodiment of the present disclosure further provides an electronic device, where the electronic device is configured to perform the foregoing control method.

In this way, in the embodiments of the present disclosure, the bezel can be rotated to adjust the electrical signal between the first conductive layer and the second conductive layer, so that the electronic device can implement corresponding functions by monitoring the electrical signal, thereby avoiding a problem of inconvenient operation on a display of the electronic device.

DETAILED DESCRIPTION OF EMBODIMENTS

The following provides detailed descriptions with reference to the accompanying drawings and specific embodiments.

Figure 1:
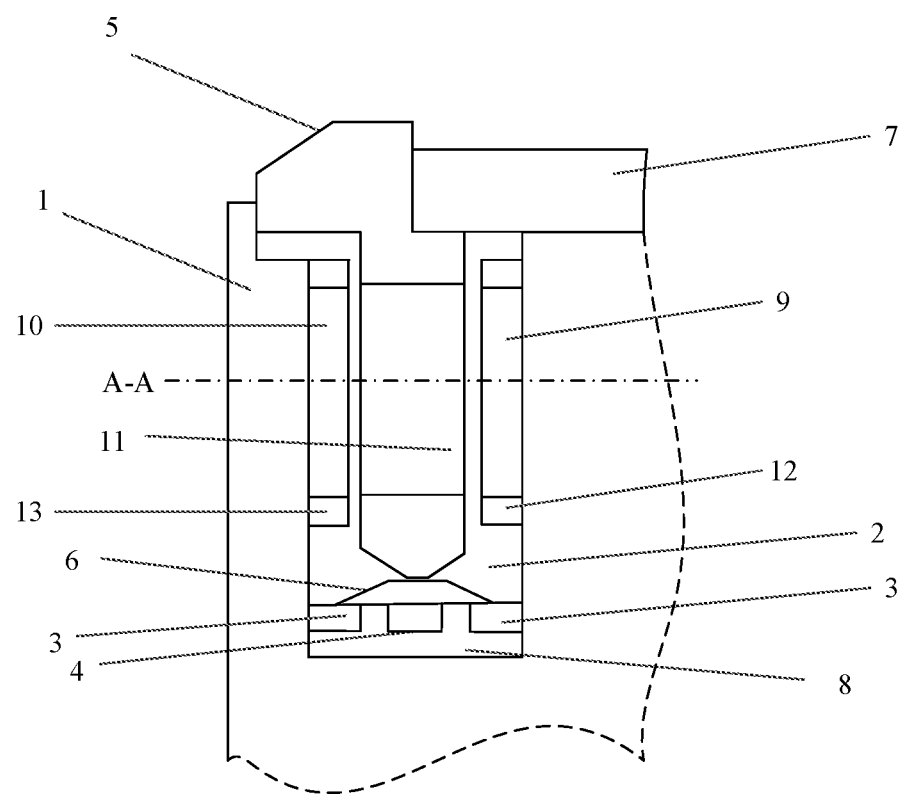
FIG. 1 is a first schematic structural diagram of an electronic device according to an embodiment of the present disclosure.
Figure 2:
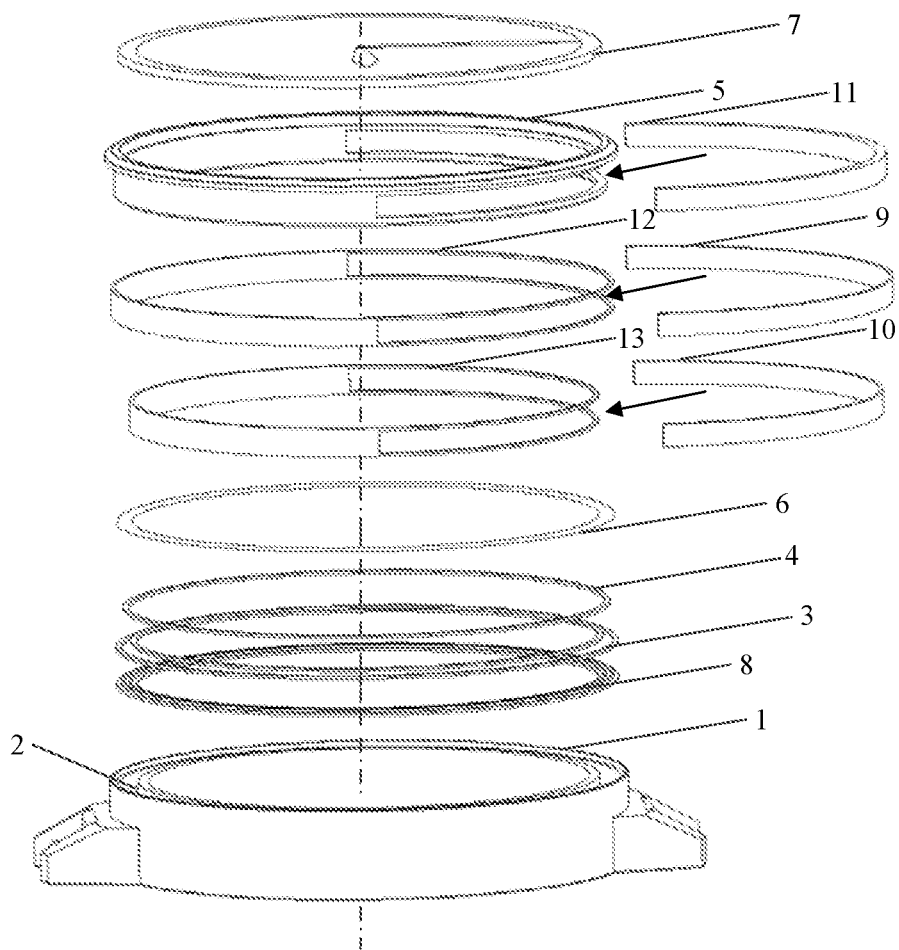
FIG. 2 is a second schematic structural diagram of an electronic device according to an embodiment of the present disclosure.

As shown in FIG. 1 and FIG. 2, an embodiment of the present disclosure provides an electronic device, including:
- a housing 1 with an accommodating space, where the housing 1 is provided with a groove 2 surrounding the accommodating space, and a first conductive layer 9 and a second conductive layer 10 are disposed on a sidewall of the groove 2; and
- a bezel 5, where at least part of the bezel 5 is disposed in the groove 2; and
- the bezel 5 is capable of rotating around an axial direction of the housing 1 in the groove 2.

In this way, a user can rotate the bezel 5 to adjust an electrical signal between the first conductive layer 9 and the second conductive layer 10, so that the electronic device can implement corresponding functions by monitoring the electrical signal, thereby avoiding a problem of inconvenient operation on a display of the electronic device.

In addition, in this embodiment, for example, a first electrode 3 and a second electrode 4 are disposed on a bottom surface of the groove 2.

When the bezel 5 is located at a first position of the groove 2, the first electrode 3 and the second electrode 4 are conductively connected; and when the bezel 5 is located at a second position of the groove 2, the first electrode 3 and the second electrode 4 are conductively disconnected.

In this way, the user can adjust a position of the bezel 5 in the electronic device, so that the first electrode 3 and the second electrode 4 on the bottom surface of the groove 2 are conductively connected when the bezel 5 is located at the first position of the groove 2, and the first electrode 3 and the second electrode 4 are conductively disconnected when the bezel 5 is located at the second position of the groove 2. In this way, the electronic device can implement corresponding functions by monitoring a connection state that the first electrode 3 and the second electrode 4 are conductively connected or disconnected, thereby avoiding the problem of inconvenient operation on the display of the electronic device.

In some embodiments, after the electronic device detects the connection state of the first electrode and the second electrode, the electronic device may be turned off or on according to a first preset policy when the connection state is being conductively connected; or a target object is selected when the connection state is being conductively connected. Certainly, the electronic device can further implement other functions based on the connection state. Examples are not described one by one herein.

In this embodiment, for example, the electronic device further includes:

an elastic member 6, disposed on the bottom surface and having an end connected to the first electrode 3.

One end of the bezel 5 facing toward the bottom surface of the groove 2 is provided with a protruding portion; when the bezel 5 is located at the first position, the protruding portion presses against the elastic member 6, and the other end of the elastic member 6 is connected to the second electrode 4; and when the bezel 5 is located at the second position, the protruding portion moves away from the elastic member 6, and the other end of the elastic member 6 is separate from the second electrode 4.

In this way, when the bezel 5 is located at the first position, the protruding portion of the bezel 5 closer to the bottom surface of the groove 2 presses against the elastic member 6, so that the elastic member 6 is connected to the second electrode 4, thereby conductively connecting the first electrode 3 and the second electrode 4. When the bezel 5 is located at the second position, as shown in FIG. 1, the protruding portion moves away from the elastic member 6, so that the elastic member 6 can restore to an original state after being released from being pressed, and is separate from the second electrode 4. In this way, the first electrode 3 and the second electrode 4 are conductively disconnected.

In some embodiments, the electronic device further includes a display 7 disposed in the accommodating space, where the bezel 5 away from the bottom surface is provided with a first limiting surface and a second limiting surface, wherein the first limiting surface is fitted to the housing and the second limiting surface is fitted to the display 7.

In FIG. 1, the second limiting surface is fitted to the display 7, so that the bezel 5 is located at the second position. In this case, the first limiting surface is separate from the housing 1. Certainly, the bezel 5 is pressed downward, so that the second limiting surface is separate from a display 7, the first limiting surface is fitted to the housing 1, and the bezel 5 is located at the first position.

It should be noted that, in this embodiment, for example, the first electrode 3 and the second electrode 4 are disposed on the bottom surface via a first support plate 8.

As shown in FIG. 2, the housing 1 is provided with the groove 2, where the groove 2 is an annular groove. Therefore, the first electrode 3 and the second electrode 4 are also annular electrodes, but with different radii. The first electrode 3 and the second electrode 4 are fastened to the first support plate 8 and disposed on the bottom surface of the groove 2 via the first support plate 8.

In some embodiments, the elastic member 6 is a pressing elastic sheet.

In this case, the pressing elastic sheet, that is, the elastic member 6, is as shown in FIG. 1 and FIG. 2, where an inner periphery is fixedly connected to the first electrode 3, an outer periphery is fixedly connected to the first support plate 8, and a part protruding at a central position is directly above the second electrode 4 and aligned with the protruding portion of the bezel 5. The protruding portion of the bezel 5 presses the pressing elastic sheet, and therefore the pressing elastic sheet is deformed to be connected to the second electrode 4. In this way, the first electrode 3 and the second electrode 4 are conductively connected.

Certainly, the first electrode 3 may be a single annular electrode, where only the inner periphery of the elastic member 6 is fixedly connected to the first electrode 3, and the outer periphery is fixedly connected to the first support plate 8.

For example, in this embodiment, the first conductive layer 9 and the second conductive layer 10 are capacitor plates disposed opposite each other on two sidewalls of the groove 2, an opening is disposed on the part of the bezel 5 located in the groove 2, and a dielectric layer 11 is embedded in the opening.

In some embodiments, the first conductive layer 9 is an arc-shaped capacitor plate with a first preset length and is embedded on a second support plate 12, and the second support plate 12 is sleeved on an inner wall of the groove 2 and has a fixed position. The second conductive layer 10 is an arc-shaped capacitor plate with a second preset length and is embedded on a third support plate 13, and the third support plate 13 is sleeved on an outer wall of the groove 2 and has a fixed position. The dielectric layer 11 is embedded on the bezel 5 and is capable of rotating as the bezel 5 is rotated, so that a capacitance value between the first conductive layer 9 and the second conductive layer 10 is modified by adjusting a position of a capacitive medium between the first conductive layer 9 and the second conductive layer 10.

Figure 3:
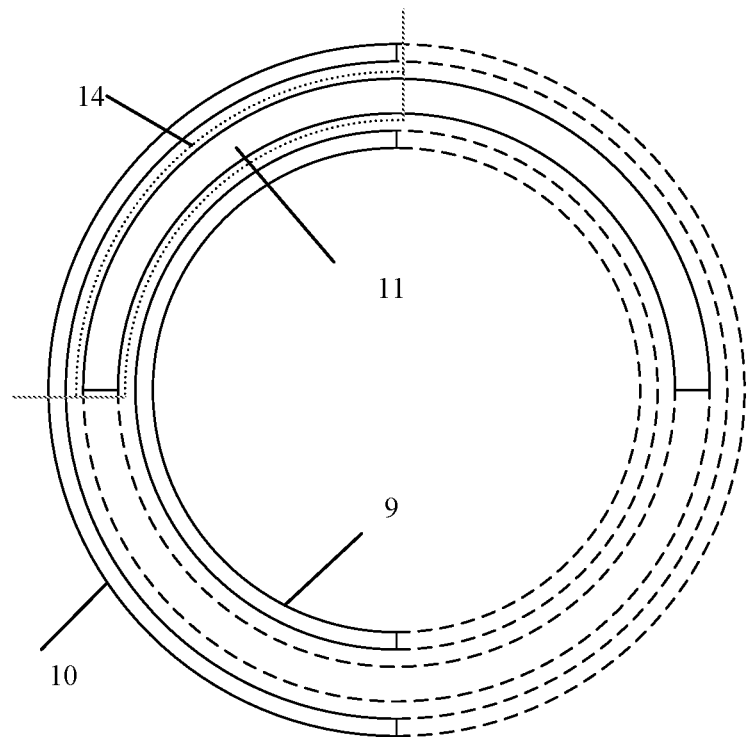
FIG. 3 is a sectional view along a plane A-A in FIG. 1.

As shown in FIG. 3, in the electronic device, an arc length at opposite position of the first conductive layer 9 and the second conductive layer 10 is $l_0$. A capacitive medium effective area 14 of the dielectric layer 11 between the first conductive layer 9 and the second conductive layer 10 is the dashed box part in the figure, where an arc length of the capacitive medium effective area 14 is L. A distance of the first conductive layer 9 directly facing toward the second conductive layer 10 is d, and a width of the first conductive layer 9 directly facing toward the second conductive layer 10 is a. A dielectric constant of air is $\varepsilon_0$, a dielectric constant of the capacitive medium is E, and an electrostatic force constant is k. A relationship between a capacitance value C between the first conductive layer 9 and the second conductive layer 10 and the arc length L of the capacitive medium effective area may be obtained as:

$$C = \frac{\varepsilon \times a \times L + \varepsilon_0 \times a \times (L_0 - L)}{4 \times \pi \times k \times d}.$$

Therefore, as C changes with L, there will be different electrical signals between the first conductive layer 9 and the second conductive layer 10. Furthermore, by monitoring the electrical signal, the electronic device can determine, according to a second preset policy, a target parameter corresponding to the current electrical signal and parameter configuration information, and adjust the target parameter of the electronic device based on the determined parameter configuration information. For example, if the second preset policy corresponds to adjusting volume by rotation, a target value of volume corresponding to the current electrical signal may be determined based on the detected electrical signal, and the volume is adjusted to the target value.

In this embodiment, the second preset policy may also correspond to adjusting luminance by rotation, selecting an application, and the like, which are not listed one by one herein.

To sum up, in the electronic device in this embodiment of the present disclosure, a position of the bezel 5 in the groove 2 can be adjusted to conductively connect or disconnect the first electrode 3 and the second electrode 4 on the bottom surface of the groove 2; and the bezel 5 can also be rotated to adjust the electrical signal between the first conductive layer 9 and the second conductive layer 10. In this way, the electronic device can implement corresponding functions by monitoring the connection state of the first electrode 3 and the second electrode 4 and the electrical signal between the first conductive layer 9 and the second conductive layer 10, thereby avoiding the problem of inconvenient operation on the display of the electronic device.

Figure 4:
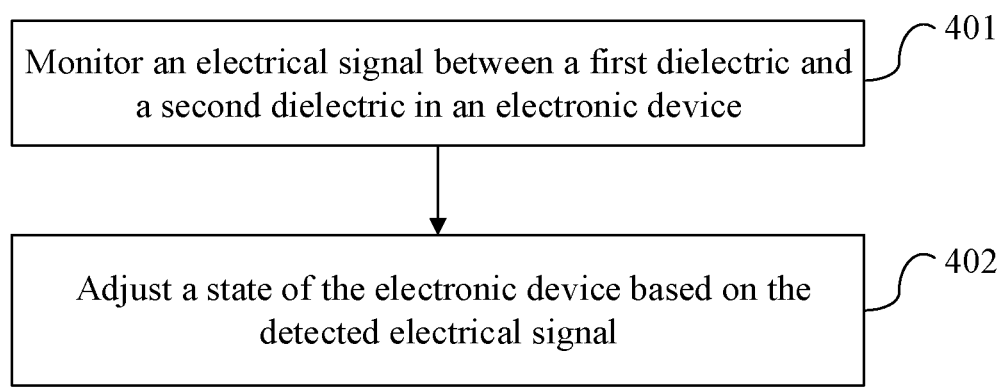
FIG. 4 is a schematic flowchart of a control method according to an embodiment of the present disclosure.

FIG. 4 shows a control method applied to the foregoing electronic device according to an embodiment of the present disclosure, and the method includes the following steps.

Step 401: Monitor an electrical signal between a first conductive layer and a second conductive layer in the electronic device.

In the foregoing embodiment, a bezel of the electronic device can be rotated, and based on rotation of the bezel, different electrical signals between the first conductive layer and the second conductive layer are triggered. Therefore, in this step, the electrical signal between the first conductive layer and the second conductive layer is detected first to identify a user need and perform targeted adjustment.

Step 402: Adjust a state of the electronic device based on the detected electrical signal.

In this step, after the detection in step 401, the adjustment of the state of the electronic device can be completed based on the detected electrical signal.

Through the steps 401 and 402, the electronic device in this embodiment of the present disclosure detects the electrical signal between the first conductive layer and the second conductive layer and triggered by rotation of the bezel in a groove, to adaptively adjust the state of the electronic device to meet the user need.

In addition, it can be learned from the foregoing embodiment of the electronic device that the bezel of the electronic device may be located at different positions in the groove to conductively connect or disconnect a first electrode and a second electrode on a bottom surface of the groove. Therefore, in some embodiments, the method further includes:

monitoring a connection state of the first electrode and the second electrode in the electronic device, where the connection state includes being conductively connected and being conductively disconnected; and adjusting the state of the electronic device based on a detected connection state.

In this way, the electronic device in this embodiment of the present disclosure detects a connection state of the first electrode and the second electrode triggered by a position change of the bezel in the groove, to adaptively adjust the state of the electronic device to further meet the user need.

In some embodiments, the adjusting the state of the electronic device based on a detected connection state includes:

turning off or on the electronic device according to a first preset policy when the connection state is being conductively connected; or selecting a target object when the connection state is being conductively connected.

In this way, according to the first preset policy, when it is detected that the connection state is being conductively connected, the electronic device is turned off or on; or, the target object is selected. Herein, whether the electronic device is turned off or on is correspondingly processed based on whether the electronic device is currently in an on-state or off-state; and the target object may be a currently displayed or frame-selected object.

In some embodiments, step 402 includes:

determining, according to a second preset policy, a target parameter corresponding to the current electrical signal and parameter configuration information, and adjusting the target parameter based on the parameter configuration information.

In this way, the electronic device can determine, for the detected electrical signal according to the second preset policy, the target parameter corresponding to the current electrical signal and the parameter configuration information, and then adjust the target parameter of the electronic device based on the determined parameter configuration information.

In some embodiments, the second preset policy includes at least one of the following:

a value of volume corresponding to the electrical signal when the connection state is being conductively disconnected; and a value of luminance corresponding to the electrical signal when the connection state is being conductively disconnected.

Therefore, according to the second preset policy, when the connection state is being conductively disconnected, the target parameter may be adjusted by rotating the bezel, and the target parameter is volume of the electronic device and luminance of the display. Of course, the parameter configuration information of the target parameter (that is, a target value to adjust) may be obtained, according to the second preset policy, from a value corresponding to the electrical signal.

In this embodiment, the second preset policy may also be used to select an application, for example, contacts, by rotation, which is not described in detail herein.

To sum up, according to the method in this embodiment of the present disclosure, the electronic device can adjust a position of the bezel based on its structure to conductively connect or disconnect the first electrode and the second electrode on the bottom surface of the groove; and can rotate the bezel to adjust the electrical signal between the first conductive layer and the second conductive layer. Therefore, the electronic device can implement corresponding functions by monitoring the connection state of the first electrode and the second electrode and the electrical signal between the first conductive layer and the second conductive layer, thereby avoiding the problem of inconvenient operation on the display of the electronic device.

Figure 5:
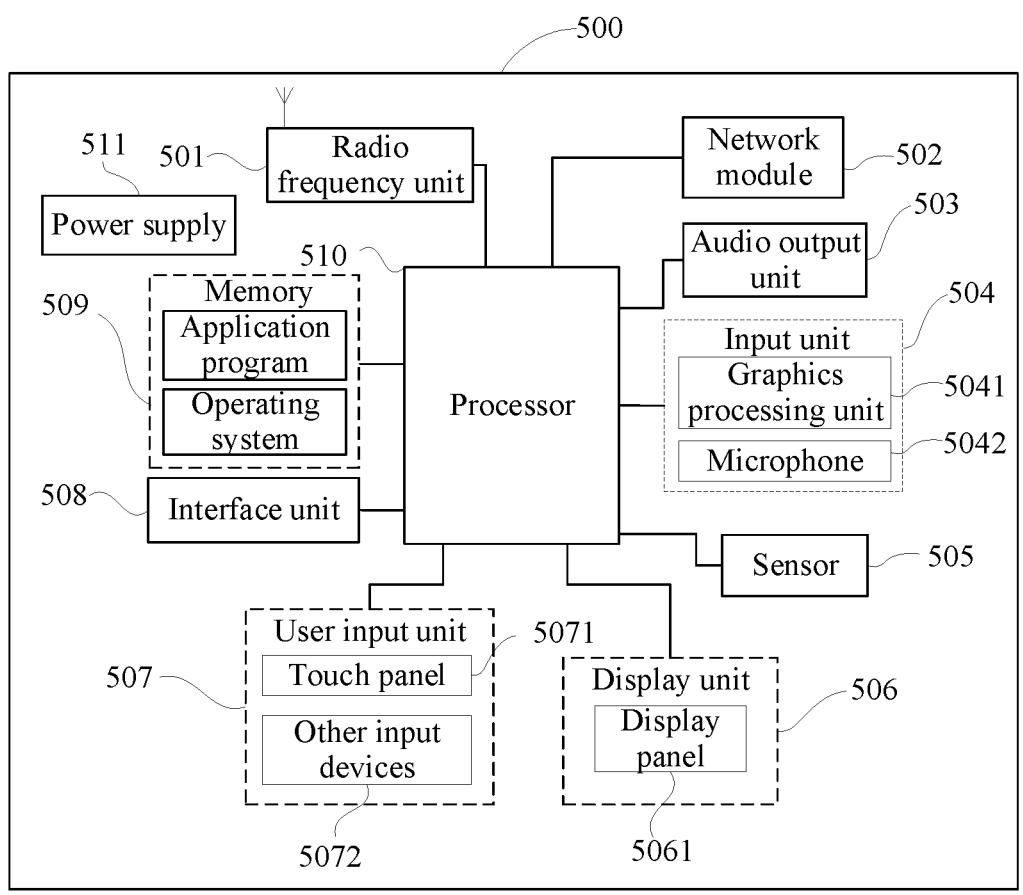
FIG. 5 is a schematic structural diagram of an electronic device according to an embodiment of the present disclosure.

FIG. 5 is a schematic structural diagram of hardware of an electronic device for implementing the embodiments of the present disclosure. The electronic device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art can understand that the structure of the electronic device shown in FIG. 5 does not constitute a limitation on the electronic device. The electronic device may include more or fewer components than those shown in the figure, or combination of some components, or components disposed differently. In this embodiment of the present disclosure, the electronic device includes but is not limited to a mobile phone, a tablet computer, a notebook computer, a palmtop computer, a vehicle-mounted terminal, a wearable device, a pedometer, or the like.

The processor 510 is configured to monitor an electrical signal between a first conductive layer and a second conductive layer in the electronic device, and
    adjust a state of the electronic device based on the detected electrical signal.

It can be learned that the electronic device can rotate a bezel based on its structure to adjust the electrical signal between the first conductive layer and the second conductive layer. Therefore, the electronic device can implement corresponding functions by monitoring the electrical signal between the first conductive layer and the second conductive layer, thereby avoiding a problem of inconvenient operation on a display of the electronic device.

It should be understood that, in this embodiment of the present disclosure, the radio frequency unit 501 may be configured to receive and send signals during an information receiving and sending process or a call process. In some embodiments, the radio frequency unit 501 receives downlink data from a base station and then delivers the downlink data to the processor 510 for processing. In addition, the radio frequency unit 501 sends uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and other devices through a wireless communications system.

The electronic device provides wireless broadband Internet access for a user by using the network module 502, for example, helping the user send and receive e-mails, browse web pages, and access streaming media.

The audio output unit 503 may convert audio data received by the radio frequency unit 501 or the network module 502 or stored in the memory 509 into an audio signal and output the audio signal as a sound. In addition, the audio output unit 503 may further provide audio output (for example, a call signal received sound or a message received sound) related to a specific function performed by the electronic device 500. The audio output unit 503 includes a speaker, a buzzer, a receiver, and the like.

The input unit 504 is configured to receive an audio or video signal. The input unit 504 may include a Graphics Processing Unit (GPU) 5041 and a microphone 5042. The graphics processing unit 5041 processes image data of a static picture or a video obtained by an image capture apparatus (for example, a camera) in a video capture mode or an image capture mode. A processed image frame may be displayed on the display unit 506. An image frame processed by the graphics processing unit 5041 may be stored in the memory 509 (or another storage medium) or sent by using the radio frequency unit 501 or the network module 502. The microphone 5042 is capable of receiving sounds and processing such sounds into audio data. The processed audio data can be converted into a format output that can be transmitted to a mobile communication base station through the radio frequency unit 501 in a telephone call mode.

The electronic device 500 further includes at least one sensor 505, for example, an optical sensor, a motion sensor, and other sensors. In some embodiments, the optical sensor includes an ambient light sensor and a proximity sensor. The ambient light sensor may adjust luminance of a display panel 5061 based on brightness of ambient light, and the proximity sensor may turn off the display panel 5061 and/or backlight when the electronic device 500 moves to an ear. As a type of motion sensor, an accelerometer sensor may detect magnitudes of accelerations in various directions (typically three axes), may detect a magnitude and direction of gravity when being stationary, and may be applied to electronic device posture recognition (for example, switching between a landscape orientation and a portrait orientation, related games, and magnetometer posture calibration), functions related to vibration recognition (for example, pedometer and tapping), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided to the user. The display unit 506 may include the display panel 5061. The display panel 5061 may be configured in a form of a Liquid Crystal Display (LCD), an Organic Light-Emitting Diode (OLED), or the like.

The user input unit 507 may be configured to receive input digit or character information, and generate key signal input related to user setting and function control of the electronic device. In some embodiments, the user input unit 507 includes a touch panel 5071 and other input devices 5072. The touch panel 5071 is also referred to as a touchscreen, and may collect a touch operation of the user on or near the touch panel 5071 (for example, an operation performed on or near the touch panel 5071 by the user by using any appropriate object or accessory such as a finger or a stylus). The touch panel 5071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 510, receives and executes a command sent by the processor 510. In addition, the touch panel 5071 may be implemented in a plurality of types, for example, as a resistive, capacitive, infrared, or a surface acoustic wave touch panel. In addition to the touch panel 5071, the user input unit 507 may further include other input devices 5072. In some embodiments, the other input devices 5072 may include but are not limited to a physical keyboard, a function key (such as a volume control key or a switch key), a trackball, a mouse, and a joystick. Details are not described herein.

Further, the touch panel 5071 may cover the display panel 5061. After detecting a touch operation on or near the touch panel 5071, the touch panel 5071 transmits the touch operation to the processor 510 for determining a type of the touch event. Then the processor 510 provides corresponding visual output on the display panel 5061 based on the type of the touch event. In FIG. 5, the touch panel 5071 and the display panel 5061 serve as two separate components to implement input and output functions of the electronic device. However, in some embodiments, the touch panel 5071 and the display panel 5061 may be integrated to implement the input and output functions of the electronic device. This is not specifically limited herein.

The interface unit 508 is an interface for connecting an external apparatus to the electronic device 500. For example, the external apparatus may include a wired or wireless headphone port, an external power (or battery charger) port, a wired or wireless data port, a memory card port, a port for connecting an apparatus with an identification module, an audio Input/Output (I/O) port, a video I/O port, an earphone port, and the like. The interface unit 508 may be configured to receive an input (for example, data information or power) from an external apparatus and transmit the received input to one or more elements within the electronic device 500, or may be configured to transmit data between the electronic device 500 and the external apparatus.

The memory 509 may be configured to store software programs and various data. The memory 509 may mainly include a program storage region and a data storage region. The program storage region may store an operating system, an application program required by at least one function (for example, an audio play function or an image play function), and the like. The data storage region may store data (for example, audio data and an address book) created based on use of the mobile phone, and the like. In addition, the memory 509 may include a high-speed random access memory, and may further include a non-volatile memory such as a disk storage device, a flash memory device, or another volatile solid-state storage device.

The processor 510 is a control center of the electronic device, uses various interfaces and lines to connect all parts of the entire electronic device, and performs various functions and data processing of the electronic device by running or executing the software program and/or module stored in the memory 509 and invoking data stored in the memory 509, thereby performing overall monitoring on the electronic device. The processor 510 may include one or more processing units. In some embodiments, the processor 510 may integrate an application processor and a modem processor. The application processor mainly processes an operating system, a user interface, an application program, and the like. The modem processor mainly processes wireless communication. It can be understood that the modem processor may alternatively not be integrated in the processor 510.

The electronic device 500 may further include the power supply 511 (such as a battery) that supplies power to the components. In some embodiments, the power supply 511 may be logically connected to the processor 510 via a power management system, so that functions such as charge and discharge management and power consumption management are implemented via the power management system.

In addition, the electronic device 500 includes some functional modules that are not shown, which are not further described herein.

An embodiment of the present disclosure further provides a computer-readable storage medium, where a computer program is stored in the computer-readable storage medium, where when the computer program is executed by a processor, the processes of the foregoing embodiment of the control method applied to the electronic device are implemented, with the same technical effects achieved. To avoid repetition, details are not described herein again. The computer-readable storage medium is, for example, a Read-Only Memory (ROM), a Random Access Memory (RAM), a magnetic disk, or an optical disk.

It should be noted that in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

A person of ordinary skill in the art may realize that units and algorithm steps of various examples described with reference to the embodiments disclosed in this specification can be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

According to the foregoing description of the implementations, a person skilled in the art can clearly understand that the methods in the foregoing embodiments may be implemented by using software in combination with a necessary common hardware platform, and certainly may alternatively be implemented by using hardware. Based on such an understanding, the technical solutions of the present disclosure essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a Read-Only Memory (ROM), a Random Access Memory (RAM), or the like.

It can be understood that the embodiments described in the embodiments of this disclosure may be implemented by hardware, software, firmware, middleware, microcode, or a combination thereof. For implementation with hardware, modules, units, and subunits may be implemented in one or more Application Specific Integrated Circuit (ASIC), a Digital Signal Processing (DSP), a DSP Device (DSPD), a Programmable Logic Device (PLD), a Field-Programmable Gate Array (FPGA), a general-purpose processor, a controller, a microcontroller, a microprocessor, another electronic unit for implementing the functions described in this disclosure, or a combination thereof.

For software implementation, the techniques described in the embodiments of this disclosure may be implemented by modules (for example, procedures or functions) that implement the functions described in the embodiments of this disclosure. Software code may be stored in the memory and executed by the processor. The memory may be implemented inside the processor or outside the processor.

The embodiments of the present disclosure are described above with reference to the accompanying drawings, but the present disclosure is not limited to these specific implementations. The foregoing implementations are merely illustrative rather than restrictive. Inspired by the present disclosure, a person of ordinary skill in the art May develop many other manners without departing from the principle of the present disclosure and the protection scope of the claims. All such manners shall fall within the protection of the present disclosure.

What is claimed is:

1. An electronic device, comprising:
a housing with an accommodating space, wherein the housing comprises a groove surrounding the accommodating space, and a first conductive layer and a second conductive layer are disposed on the housing and on a first sidewall and a second sidewall of the groove, respectively; and
a bezel, wherein at least a part of the bezel is disposed in the groove, wherein the bezel is configured to rotate around an axial direction of the housing in the groove,
wherein a first electrode and a second electrode are disposed on a bottom surface of the groove,
wherein when the bezel is located at a first position of the groove, the first electrode and the second electrode are conductively connected, and when the bezel is located at a second position of the groove, the first electrode and the second electrode are conductively disconnected, and
wherein the electronic device further comprises:
an elastic member, disposed on the bottom surface and having a first end connected to the first electrode,
wherein one end of the bezel facing toward the bottom surface of the groove is provided with a protruding portion; when the bezel is located at the first position, the protruding portion presses against the elastic member, and a second end of the elastic member is connected to the second electrode; and when the bezel is located at the second position, the protruding portion moves away from the elastic member, and the second end of the elastic member is separate from the second electrode.

2. The electronic device according to claim 1, wherein the first conductive layer and the second conductive layer are capacitor plates disposed opposite each other on the first and second sidewalls of the groove, an opening is disposed on a part of the bezel located in the groove, and a dielectric layer is embedded in the opening.

3. The electronic device according to claim 1, further comprising a display disposed in the accommodating space; wherein
the bezel away from the bottom surface is provided with a first limiting surface and a second limiting surface, wherein the first limiting surface is fitted to the housing and the second limiting surface is fitted to the display.

4. The electronic device according to claim 1, wherein the first electrode and the second electrode are disposed on the bottom surface via a support plate.

5. The electronic device according to claim 1, wherein the elastic member is a pressing elastic sheet.

* * * * *